April 18, 1961  H. J. MURPHY  2,979,797
FASTENER FOR SECURING ANCHORAGE IN A HOLE
Filed Nov. 25, 1957
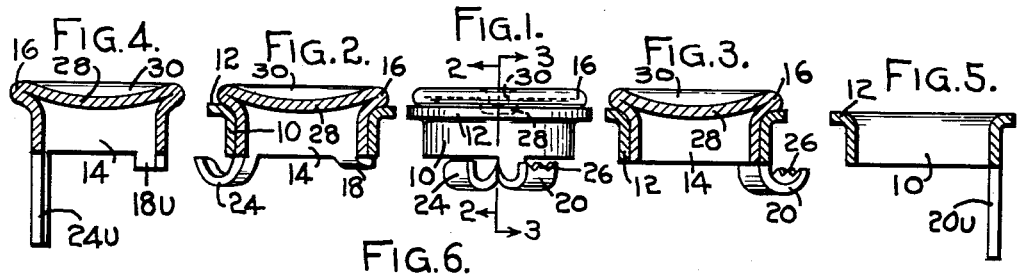
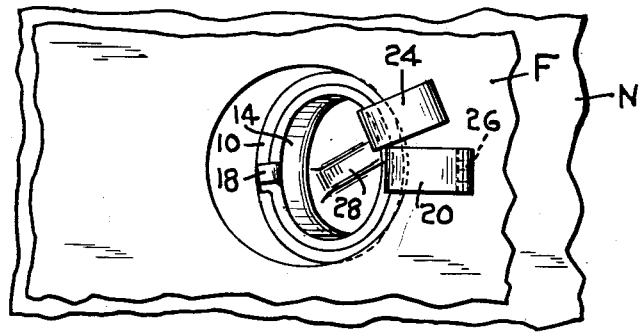
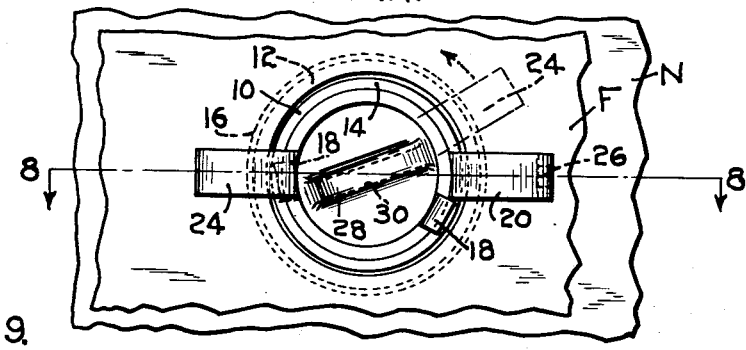
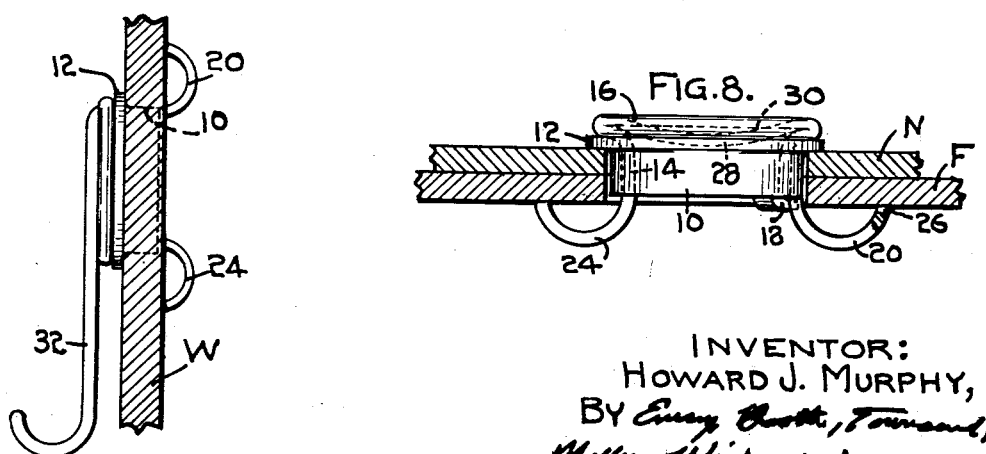
INVENTOR:
HOWARD J. MURPHY,
BY
ATTORNEYS.

United States Patent Office 2,979,797
Patented Apr. 18, 1961

2,979,797
FASTENER FOR SECURING ANCHORAGE IN A HOLE

Howard J. Murphy, North Wilmington, Mass., assignor to United-Carr Fastener Corporation, Cambridge, Mass., a corporation of Delaware Filed Nov. 25, 1957, Ser. No. 698,706

1 Claim. (Cl. 24—221)

This invention relates to a fastening device for securing anchorage in a hole, which fastener is introduced from the nearer face of the structure or part in which the hole is made, and is secured by engagement with the margin of the hole at its further end, even when that end may not be conveniently accessible. It may be used in connection with a perforated plate for mounting at the nearer face of the plate a structure, either integrally or otherwise, carried by the fastener, or it may be applied through a hole in such a structure mating with that of the plate. In particular the structure referred to in the preceding sentence may be an overlapping or overlying plate and the fastener a device for securing two plates together somewhat in the manner of a rivet.

The securing of the fastener is effected by manipulating the fastener from the exterior or nearer face of the perforated member and without the necessity of reaching to the further face around any corner or margin, and without the insertion of any tool through the hole or the deformation or bending over of any part of the further side. The fastener may be released and withdrawn, but probably under most conditions of use now contemplated such withdrawal would not frequently, if ever, be called for and the anchorage might be considered as a substantially permanent one.

The invention will be well understood by reference to the following description taken in connection with the accompanying drawings wherein:

Fig. 1 is a side elevation of the fastening device as such;

Figs. 2 and 3 are setcions on the lines 2—2 and 3—3 of Fig. 1 respectively;

Fig. 4 is a section of an inner element of the fastener before it is assembled with an outer cooperating element and parts thereof bent;

Fig. 5 is a similar sectional view of the outer element;

Fig. 6 is a view, partly broken away, from the rear face or toward what is hereinafter referred to as the "further side" of two superposed plates having registering holes therein and showing the fastener partially positioned in such holes;

Fig. 7 is a similar view showing the fastener in place and adjusted to locked position;

Fig. 8 is a section on the line 8—8 of Fig. 7; and

Fig. 9 is a fragmentary, vertical section showing the fastener organized in the manner of a shank on a hook and supporting the hook by cooperation with a hole in a part of extended surface area.

In the form of the invention chosen for illustration by way of example, the fastener as seen in Figs. 1, 2 and 3 comprises an exterior element 10 to be introduced in the hole, which element herein is a sleeve in the form of a right circular cylinder (since in the example shown use in a round hole is contemplated) having at its upper end viewing those figures a flange 12 which bears on the margin of the hole at the nearer face of the perforated structure when the cylindrical body is introduced into the hole. Journalled to turn in the outer element is an inner element 14, herein also a similarly cylindrical sleeve, telescoped into sleeve 10 and having at the upper end as seen in Figs. 1, 2 and 3 a flange 16 overlying flange 12. The two sleeves are secured together by an extension from the end of sleeve 14 bent over the further end of sleeve 10 to provide a lug 18. All the parts hitherto described except the overhanging flanges 12 and 16 are organized to lie within the outline of the hole in which the fastener is to be used. To bear on the further margin of the hole, and cooperating with the flange 12 to grip its edge, the lower edges viewing Figs. 1–3 of the parts 10 and 14 are provided respectively with portions 20 and 24 of limited circumferential extent, but of substantial radial extent to reach out behind the further margin of the hole, and these are herein extensions of the cylindrical walls of the parts 10 and 12 curled over to form hooks, the points of which face rearwardly and cooperate with the further margin of the hole when the fastener is locked in place.

In Figs. 4 and 5 the inner and outer elements 14 and 12 respectively are shown in an unfinished state prior to their assembly, and the numerals 18u, 20u and 24u are the parts so numbered in Figs. 1, 2 and 3, the addition of the letter u (suggestive of the word "unfinished") distinguishing them from the parts of the finished articles which are differently shaped. It will be seen that 20u and 24u are formed as extensions of the cylindrical surfaces of 10 and 14 in an axial direction and the two elements may be telescoped until flange 16 comes to rest on flange 12. They are then locked together by bending outwardly 18u to form the locking lug 18, as best seen in Fig. 2, and the extensions 20 and 24 are curled over to the hook-shaped form shown respectively in Figs. 3 and 2. In the example shown the portion 20 of the outer member has its end formed with teeth 26 for a purpose to be described.

In the form shown the nearer end of the inner member 14 is closed by a web 28 and a straight sided depression 30, like the screwdriver slot in the head of a screw, may be formed in the closure. Its walls are an example of eccentrically located surfaces providing for applying turning pressure on the inner member.

In one relative position of the two elements 10 and 14 the two hooks 20 and 24 lie side by side abutting one another as seen in Figs. 1 and 6. If the inner one is rotated relatively to the other its hook 24 will move away to an approximately diametrical position as illustrated in Fig. 7, where it is stopped by the engagement of lug 18 with hook 20.

Figs. 6 and 7 are a view from the further or rear face of two plates N and F (the letters are intended to be suggestive of the words "near" and "far") overlying one another, and having aligned holes to receive the fastener which will secure them together. With the hooks 20 and 24 of the fastener in the position shown in Fig. 2, it is positioned at an angle to the front face of the plate N and the points of the hooks pass under the further face of plate F (the one on top in Figs. 6 and 7 because we are looking at the back side) to overlie that face of F at the margin of the hole. It is then turned downwardly to bring flange 12 down on the exterior face of plate N. If it is not brought fully home it will be drawn down at the right-hand side viewing Fig. 6 when closure of the fastening is completed. The inner element 14 is then rotated within the outer 12 as by the application of a screwdriver to the slot walls 30 and the inner member turns to the position of Figs. 7 and 8 with its hook 24 substantially diametrically disposed to the hook 20, and the two ends of the hooks locked behind the margin of the hole.

Since in the example shown the exterior surface of the outer member 10 is circular and fits a circular hole, it is desirable to have some provision for preventing it from rotating when the near member 14 is turned therein, without the necessity of holding it at its nearer end (at flange 12 for example). Herein the teeth 26 already referred to dig into the surface of plate F and impede rotation of the outer member.

The fastener may be released by rotating the inner element back to bring the two hooks in the position shown in Fig. 2 and the element pried up at the right of Figs. 6 and 7 and withdrawn by a reversal of the movements by which it was entered.

The distance between the points of hook portions 20 and 24 and the shoulder provided by flange 12 should be adapted to the thickness of the work, the combined thicknesses of plates N and F in Fig. 8, and may desirably be somewhat smaller. While the fastener would not become disengaged because of slight axial looseness a tight engagement is preferable. The resiliently yielding character of the form of the parts 20 and 24 illustrated ensures this and also provides for a tolerance. The points of the hook portions when adjacent and presented to the hole in the position of Fig. 6 have a wide clearance from the further face of plate F. Even apart from any axial pressure exerted by the operator the clearance of the point of 24 would diminish as it turned and it soon would begin to ride on that face and draw the fastener toward the further face. Finally in the position of Fig. 7 both hooks would be tensioned against that face.

In Fig. 9 there is shown the fastener used for supporting an element effectively integral therewith by entry in a hole in a structure W (suggestive of the word "wall") of an extended surface and herein shown as an effectively single thickness. I have here shown a hook 32 (a coat hook or a hanger hook for wires or a pipe for instance) secured to the left-hand end viewing Fig. 9 of the inner element of a fastener such as is shown in detail in Fig. 1, the fastener then being in effect a securing shank for the hook. It finds anchorage in a hole in supporting structure W, with hook portions 20 and 24 turned to their diametrical positions to overlie the further surface of W above and below the hole respectively.

I am aware that the invention may be embodied in other specific forms without departing fromt he spirit or essential attributes thereof, and I therefore desire the present embodiment to be considered in all respects as illustrative and not restrictive, as is in fact clear in several matters from the description itself. Reference is to be had to the appended claim to indicate those principles of the invention exemplified by the particular embodiment described and which I desire to secure by Letters Patent.

I claim:

A device for securing anchorage to a supporting member by cooperation with the margins of a hole in the member comprising two elements in the form of telescoping sleeves in the form of right circular cylinders relatively rotatable one within the other and forming a shank to be received in the hole, the sleeves having cooperating portions at their nearer ends holding them from disassembly in one axial direction, including at least one flange projecting radially to overlie the nearer margin of the hole, the further ends of the sleeves having extensions of limited circumferential extent projecting radially, the rotatable relationship of the sleeves permitting the two portions to be positioned adjacent one another and inserted through the hole and beneath a margin thereof preparatory to the introduction of both sleeves into the hole from the nearer side, the said portions after subsequent relative rotation of the sleeves lying beneath said margin at opposite sides of the holes the extensions being outwardly extending recurved resilient hooks having points adapted to bear on the further margin of the hole.

References Cited in the file of this patent

UNITED STATES PATENTS

| | | |
|---|---|---|
| 20,707 | Goodwin | June 29, 1858 |
| 1,850,622 | Fenton | Mar. 22, 1932 |

FOREIGN PATENTS

| | | |
|---|---|---|
| 3,766 | Great Britain | Sept. 24, 1878 |
| 14,206 | Great Britain | July 25, 1895 |